(12) United States Patent
Yoshimatsu et al.

(10) Patent No.: US 7,631,547 B2
(45) Date of Patent: Dec. 15, 2009

(54) SCANNING PROBE APPARATUS AND DRIVE STAGE THEREFOR

(75) Inventors: Nobuki Yoshimatsu, Kawasaki (JP); Takao Kusaka, Yokohama (JP); Susumu Yasuda, Tsukuba (JP); Junichi Seki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 213 days.

(21) Appl. No.: 11/612,111

(22) Filed: Dec. 18, 2006

(65) Prior Publication Data

US 2007/0144243 A1 Jun. 28, 2007

(30) Foreign Application Priority Data

Dec. 22, 2005 (JP) .............................. 2005-370094

(51) Int. Cl.
- G01B 5/28 (2006.01)
- G01N 13/16 (2006.01)
- G12B 21/24 (2006.01)

(52) U.S. Cl. ..................... 73/105; 850/1; 850/6; 850/8; 850/33

(58) Field of Classification Search ................... 73/105; 850/1, 6, 8, 33, 63
See application file for complete search history.

(56) References Cited

U.S. PATENT DOCUMENTS

| 5,297,130 | A | * | 3/1994 | Tagawa et al. ............... 369/126 |
| 5,751,684 | A | | 5/1998 | Takeda et al. |
| 5,753,911 | A | | 5/1998 | Yasuda et al. |
| 6,195,313 | B1 | | 2/2001 | Seki et al. |
| 6,323,483 | B1 | | 11/2001 | Cleveland et al. |
| 6,437,343 | B1 | * | 8/2002 | Okazaki et al. ......... 250/442.11 |
| 6,459,088 | B1 | | 10/2002 | Yasuda et al. .......... 250/442.11 |
| 2007/0158559 | A1 | | 7/2007 | Kusaka et al. ............... 250/309 |

FOREIGN PATENT DOCUMENTS

| JP | 2000-088983 | 3/2000 |
| JP | 2002-082036 | 3/2002 |
| JP | 2003-140053 | 5/2003 |
| JP | 2004-333350 | 11/2004 |
| JP | 2005-147980 | 6/2005 |
| WO | WO 97/34122 | 9/1997 |

OTHER PUBLICATIONS

Japanese Office Action dated Jan. 6, 2009, in corresponding Japanese Patent Application No. 2005-370094 (with excerpt English translation).

* cited by examiner

*Primary Examiner*—Daniel S Larkin
(74) *Attorney, Agent, or Firm*—Fitzpatrick, Cella, Harper & Scinto

(57) ABSTRACT

A scanning probe apparatus for obtaining information of a sample or processing the sample with relative movement between the sample and the apparatus includes a sample stage for holding the sample, and a drive stage with a probe, a cantilever supporting the probe, a cantilever holding member for holding the cantilever, and a drive element for driving the probe in three directions perpendicular to each other. In addition, a movable portion surrounds the drive element and is positioned outside of the drive element, with the movable portion movable in a direction in which an inertial force generated during movement of the probe is canceled. The drive stage includes an optical path, through which light passes, provided inside of the drive stage.

3 Claims, 4 Drawing Sheets

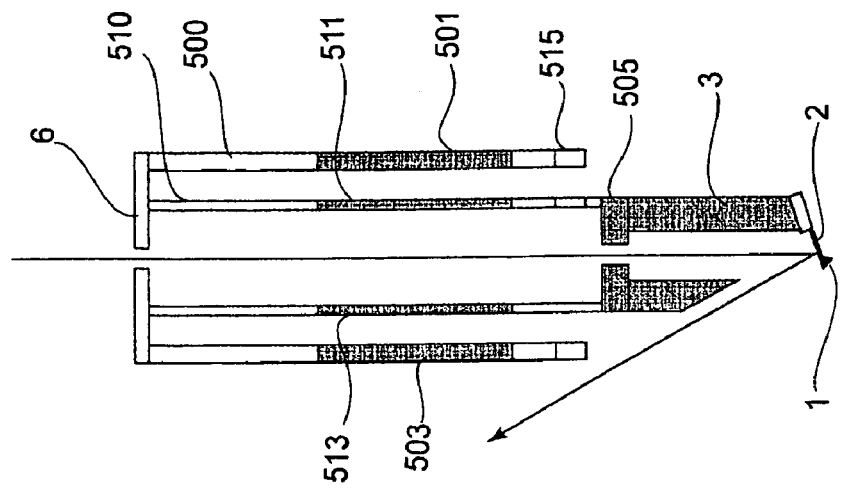
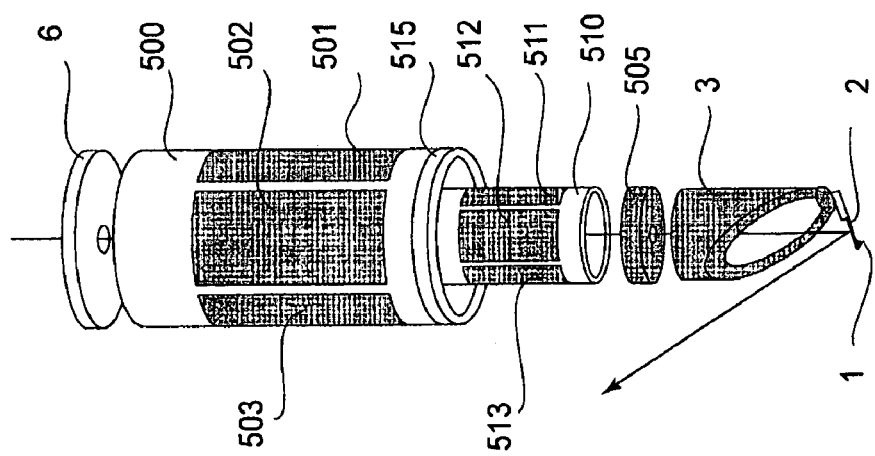

SCANNING PROBE APPARATUS AND DRIVE STAGE THEREFOR

FIELD OF THE INVENTION AND RELATED ART

The present invention relates to a scanning probe apparatus for obtaining information of a sample or effecting processing of the sample or information recording by ordinarily utilizing a scanning probe microscope (SPM), and a drive stage for the scanning probe apparatus.

Japanese Laid-Open Patent Application (JP-A) No. 2002-082036 has disclosed a scanning mechanism for an SPM capable of suppressing an occurrence of a vibration caused by a scanning operation to permit high-accuracy position control at high speed.

More specifically, as shown in FIG. 6, a scanning mechanism 200 includes bases 201 and 202 for drive elements (actuators), drive element holding members 206 and 207 provided on the bases, a drive element 203 held by these holding members and capable of expanding and contracting in a Y direction, a drive element 204 fixed at one end of the drive element 203 and capable of expanding and contracting in an X direction, a drive element 205 fixed at one end of the drive element 204 and capable of expanding and contracting in a Z direction, and a sample stage 208 provided on one end of the drive element 205. The drive element 205 is connected to the drive element 204 in its center or the neighborhood of the center.

JP-A No. 2000-08893 has disclosed an SPM which includes a small-size and lightweight drive stage causing less occurrence of vibration even when driven at high speed and is capable of obtaining a clear image at high speed.

More specifically, FIG. 7 shows a drive stage including a supporting member, two or more movable portions 505 and 515 supported by the supporting member, and two drive elements 500 and 510 for driving the two or more movable portions. This drive stage is constituted so that the movable portions 505 and 515 are driven in a direction in which inertial forces generated in the movable portions are mutually canceled during the drive of the drive elements. In this case, each drive element itself is moved in three directions of X, Y and Z, so that the movable portions and the drive elements can also be inclusively referred to as movable portions.

In the case of the drive stage as shown in FIG. 7, a sample holding table is provided on an outer cylindrical piezoelectric element, and an inner cylindrical piezoelectric element as the movable portion movable in the inertial force canceling direction is provided in an inner space defined by the outer cylindrical piezoelectric element and the sample holding table.

For this reason, a range in which the inner cylindrical piezoelectric element and a counterweight are movable is limited.

Particularly, in the case of an SPM for observing a minute sample, the sample holding table is not required to be increased in size. In this case, in order to provide a smaller-size apparatus, the sample holding table and the outer cylindrical piezoelectric element are required to be decreased in size. As a result, the inner space is further reduced.

Further, also in the case where the drive stage shown in FIG. 7 is intended to be used as a stage for scanning a probe, the cylindrical piezoelectric element is not required to be increased in size, so that the cylindrical piezoelectric element is required to be decreased in size in order to ensure a small size of the apparatus. As a result, also in this case, the inner space is further reduced.

In the above described cases, a movable range of the inner cylindrical piezoelectric element and the counterweight is further restricted, so that there is a possibility that the inner cylindrical piezoelectric element cannot sufficiently move so that it cancels the inertial force generated by the motion of the outer cylindrical piezoelectric element.

Further, as one embodiment of use of the SPM, such a demand that a cantilever provided with a sample or a probe is irradiated with light for observation or measurement through the drive stage has also been generated.

SUMMARY OF THE INVENTION

A principal object of the present invention is to provide a scanning probe apparatus capable of enlarging a movable range of a drive element movable in a direction of canceling an inertial force when compared with a conventional scanning probe apparatus.

Another object of the present invention is to provide a scanning probe apparatus capable of passing light for observation or measurement or an interconnecting line (wire) through a piezoelectric element.

A further object of the present invention is to provide a drive stage for the above described scanning probe apparatuses.

According to an aspect of the present invention, there is provided a scanning probe apparatus for obtaining information of a sample or processing the sample with relative movement between the sample and said apparatus, said apparatus comprising:

a sample stage for holding the sample;

a probe provided on a drive stage, wherein said drive stage includes a probe table for holding the probe and a drive element for moving the probe; and a movable portion surrounding the drive element outside the drive element and movable in a direction in which an inertial force generated during movement of the probe table is canceled.

According to another aspect of the present invention, there is provided a scanning probe apparatus for obtaining information of a sample or processing the sample with relative movement between the sample and said apparatus, said apparatus comprising:

a probe; and a sample stage, for holding the sample, comprising a drive element for moving a sample holding table; and a movable portion surrounding the drive element outside the drive element and movable in a direction in which an inertial force generated during movement of the sample holding table is canceled.

According to a further aspect of the present invention, there is provided a drive stage for a scanning probe apparatus, comprising a probe and a sample stage for holding a sample, for obtaining information of a sample or processing the sample with relative movement between the sample and the apparatus, said drive stage comprising:

a drive element for moving the probe or a sample holding table; and a movable portion movable in a direction in which an inertial force generated during movement of the probe table is canceled, wherein the movable portion surrounds the drive element outside the drive element.

In the present invention each of the drive element and the movable portion may preferably include an electromechanical transducer. The electromechanical transducer may preferably include a cylindrical piezoelectric element.

Further, in the present invention, the drive stage may preferably have an optical path through which light passes or a space through which an interconnecting line passes.

According to an embodiment of the present invention, it is possible to ensure a movable range of the movable portion as a counterweight, so that an inertial force can be always effectively canceled to suppress a vibration of a supporting member, thus resulting in suppression of a vibration of a sample or a probe.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 1 is a schematic view for illustrating constitutional parts of a drive stage for a scanning probe apparatus according to Embodiment 1 of the present invention.

FIG. 2 is a schematic sectional view of the drive stage shown in FIG. 1.

DETAILED DESCRIPTION OF THE PREFERRED EMBODIMENTS

Figure 3:
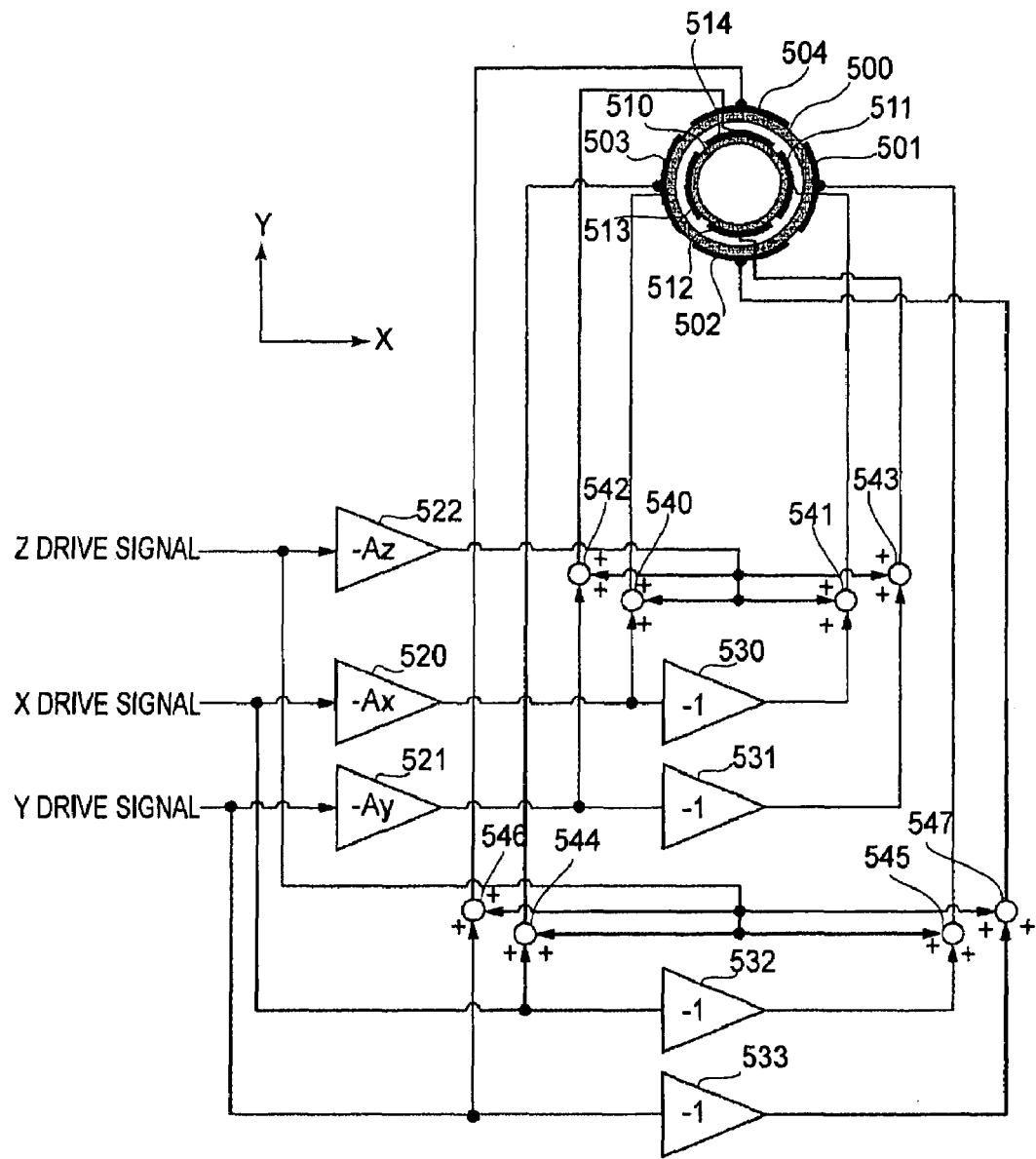
FIG. 3 is a schematic view for illustrating a driving method of the drive stage used in the present invention.

In the present invention, as the scanning probe apparatus, it is possible to use a scanning probe microscope (SPM).

The SPM is a scanning microscope for obtaining information of a surface of a sample or processing the sample by effecting mechanical scanning with a mechanical probe and is a general name of microscopes including scanning tunneling microscope (STM), atomic force microscope (AFM), (scanning) magnetic force microscope (MFM), scanning capacitance microscope (SCaM), scanning near-field optical microscope (SNOM), and scanning thermal microscope (SThM).

The scanning probe microscope (SPM) is capable of effecting raster scanning of a mechanical probe and a sample relative to each other in XY directions to obtain surface information in a desired sample region through the mechanical probe, thus displaying the surface information on a TV monitor in a mapping mode. Further, the SNOM or the like is capable of effecting fine processing by the action of light emitted from a tip of the mechanical probe onto a member to be processed or capable of effecting information recording with light. Further, it is also possible to effect fine processing or information recording, such as formation of projections and recesses at a sample surface.

In such an SPM, a scanning mechanism for effecting motion in Z direction by performing feedback control so that an interaction between the sample and probe is constant also in Z direction during XY scanning. The motion in Z direction is, different from regular movement in XY directions, an irregular motion since it reflects a sample shape or sample state of the sample, but is generally referred to as a scanning operation in Z direction. The Z direction scanning is a motion at a highest frequency among the scannings in XYZ directions. More specifically, the SPM has a scanning frequency of from about 0.05 Hz to about 200 Hz in X direction. A Y direction scanning frequency is about 1/(number of Y direction scanning lines). The number of Y direction scanning lines is 10-1000 lines. Further, a Z direction scanning frequency is from about (X direction scanning frequency)×(number of pixels per one scanning line in X direction) to about 100×(X direction scanning frequency)×(number of pixels per one scanning line in X direction).

For example, when an image of 100 pixels in X direction and 100 pixels in Y direction is acquired in 1 sec., the X direction scanning frequency is 100 Hz, the Y direction scanning frequency is 1 Hz, and the Z direction scanning frequency is 10 kHz or more. Incidentally, this Z direction scanning frequency is currently the highest scanning frequency. Most SPMs remain at an X direction scanning frequency of about several Hz. In order to realize the above described higher frequencies, a scanning mechanism therefor is required to be not only stable against external vibration but also suppressed in vibration generated by the scanning mechanism itself during an inner scanning operation.

According to an embodiment of the present invention, in a scanning probe apparatus which includes a probe and a sample stage for holding a sample and obtain information of a sample or process the sample with relative movement between the sample and the apparatus, (1) the probe is characterized in that it is provided on a drive stage comprising a probe table for holding the probe, a drive element for moving the probe, and a movable portion surrounding the drive element outside the drive element and movable in a direction in which an inertial force generated during movement of the probe table is canceled, or (2) the sample stage is characterized in that it includes a probe table for holding the probe, a drive element for moving a sample holding table, and a movable portion surrounding the drive element outside the drive element and movable in a direction in which an inertial force generated during movement of the probe table is canceled.

Further, the scanning probe apparatus may also include both of the above described features (1) and (2).

The probe usable in the present invention may be formed of silicon, silicon nitride, tungsten, cobalt, carbon fiber, etc. A shape and material for the probe may be appropriately selected depending on uses of the SPM.

The probe is provided to a cantilever of silicon or another metal and a surface of the cantilever may be coated with metal such as aluminum or platinum.

The drive element usable in the present invention may preferably be an electromechanical transducer such as a piezoelectric element. The piezoelectric element may have a cylindrical shape or a lamination shape. At least as a piezoelectric element for driving a counterweight, a cylindrical piezoelectric element may preferably be used.

The movable portion usable in the present invention may be a combination of the counterweight and the drive element such as the electromechanical transducer for driving the counterweight or may also be a drive element also having the function as the counterweight.

Embodiment 1

FIG. 1 is a schematic view for illustrating constitutional parts of a drive stage of a scanning probe apparatus in this embodiment of the present invention. FIG. 2 is a schematic sectional view of the drive stage.

In this embodiment, the drive stage is used as a drive stage for a probe, not for a sample.

Onto a base table 505 as a sample holding table having a throughhole through which light passes, a cantilever holding member 3 for holding a cantilever 2 having a probe 1 is connected.

FIG. 3 is a schematic view for illustrating a driving method of the drive stage of this embodiment.

As shown in FIG. 3, the drive stage includes two drive elements consisting of two cylindrical piezoelectric elements concentrically disposed. More specifically, inside a first cylindrical piezoelectric element 500, a second cylindrical piezoelectric element 510 is concentrically disposed. This state is shown in FIG. 1 as an exploded view. Around the first cylindrical piezoelectric element 500, divided four electrodes 501 to 504 are disposed (in FIG. 1, the electrode 504 is not shown since it is located on a backside), and at an upper portion of the first cylindrical piezoelectric element 500, a counterweight 515 is connected. Further, around the second cylindrical piezoelectric element 510, divided four electrodes 511 to 514 are disposed (in FIG. 1, the electrode 514 is not shown), and at an upper portion of the second cylindrical piezoelectric element 510, a transparent sample holding table 505 is connected. The first and second cylindrical piezoelectric elements 500 and 510 can be bent by controlling voltages applied to opposite two electrodes (501 and 503, 502 and 504, 511 and 513, or 512 and 514) so that one of the two electrodes is expanded and the other electrode is contracted. Further, it is also possible to expand and contrast each of the cylindrical piezoelectric elements in a long axis direction by applying the same voltage to the divided four electrodes. In short, the bending and the expansion and contraction of the cylindrical piezoelectric elements 500 and 510 can be controlled by voltages. Therefore, it is possible to three-dimensionally drive the sample holding table 505 disposed at the upper (top) portion of the cylindrical piezoelectric element 510 and the counterweight 515 disposed at the upper (top) portion of the cylindrical piezoelectric element 500.

As indicated by an arrow in FIG. 1 or 2, through an optical (light) path inside the drive stage in this embodiment, light passes. This light is reflected by a back surface (opposite from a surface on which the probe is provided) of the cantilever in the neighborhood of a tip of the cantilever, thus entering an optical sensor through an unshown optical system. By detecting a light-receiving position or the like of the reflected light, it is possible to measure displacement of the cantilever, i.e., displacement of the probe.

According to this embodiment, the light for measurement passes in the drive stage, so that an optical system for measuring the displacement of the probe can be incorporated into a main assembly of the SPM in a compact manner.

In this embodiment constituted as described above, the drive stage is always driven so that inertial forces generated with respect to the outer first cylindrical piezoelectric element 500 and the inner second cylindrical piezoelectric element 510 are canceled. As a result, movement of the center of gravity of the drive stage can be suppressed so that it is zero or a negligible level. Accordingly, vibration of a supporting base (member) 6 for supporting the two cylindrical piezoelectric elements together can be suppressed, so that it is possible to provide a drive stage causing less vibration even when driven at high speed.

More specifically, the counterweight is formed in a circular plate-like shape with a central hollow portion, and the outer drive element for moving the counterweight is formed in a cylindrical shape having a larger diameter than the inner drive element and is disposed outside the inner drive element for scanning-driving the probe. As a result, it is possible to ensure a movable range of the counterweight. Thus, the inertial forces are always effectively canceled, so that vibration of the supporting member leading to vibration of the probe can be suppressed.

It is generally very difficult to design a probe scanning-type high resolution SPM from the viewpoint of noise removal. However, it is possible to suppress an occurrence of vibration during the scanning operation by providing the counterweight and the piezoelectric element for driving the counterweight. In this case, it is necessary to ensure an optical path of laser light for monitoring displacement of the cantilever, so that a counter piezoelectric element is disposed outside the inner piezoelectric element. As a result, it is possible to realize a scanning mechanism for an SPM capable of performing high-accuracy position control at high speed.

Further, in the case of using the SNOM as the SPM, an optical fiber probe is required to be passed through a piezoelectric element. In this case, it is that an optical fiber (optical path) is provided in an inner space of a cylindrical piezoelectric element. Further, in the cases of providing a device for heating and/or cooling the probe or adding a function of applying a voltage to the probe, through the inner space of the cylindrical piezoelectric element, an interconnecting line for that purpose may desirably be passed.

Embodiment 2

Figure 4:
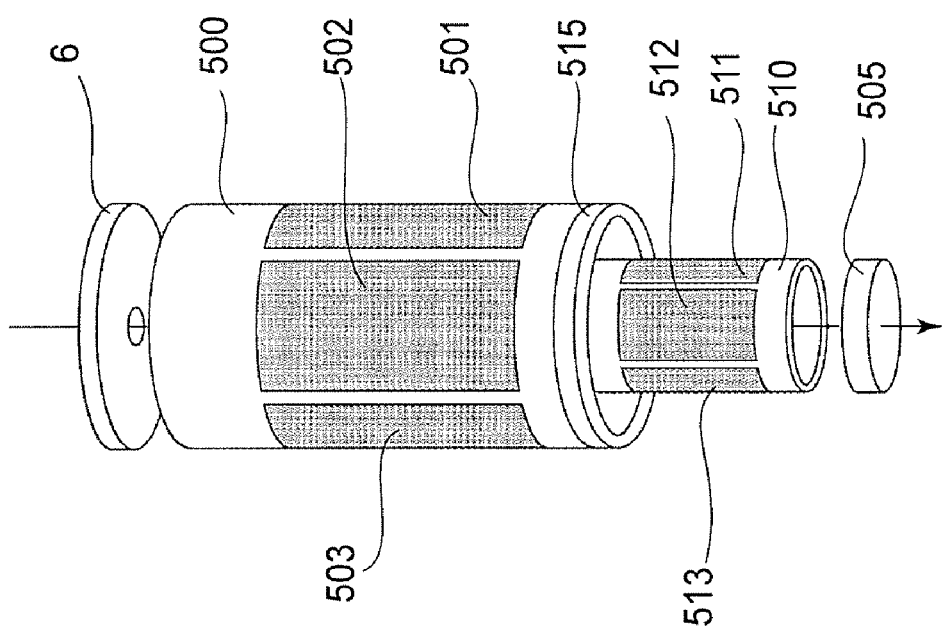
FIG. 4 is a schematic view for illustrating constitutional parts of a drive stage for a scanning probe apparatus according to Embodiment 2 of the present invention.
Figure 6:
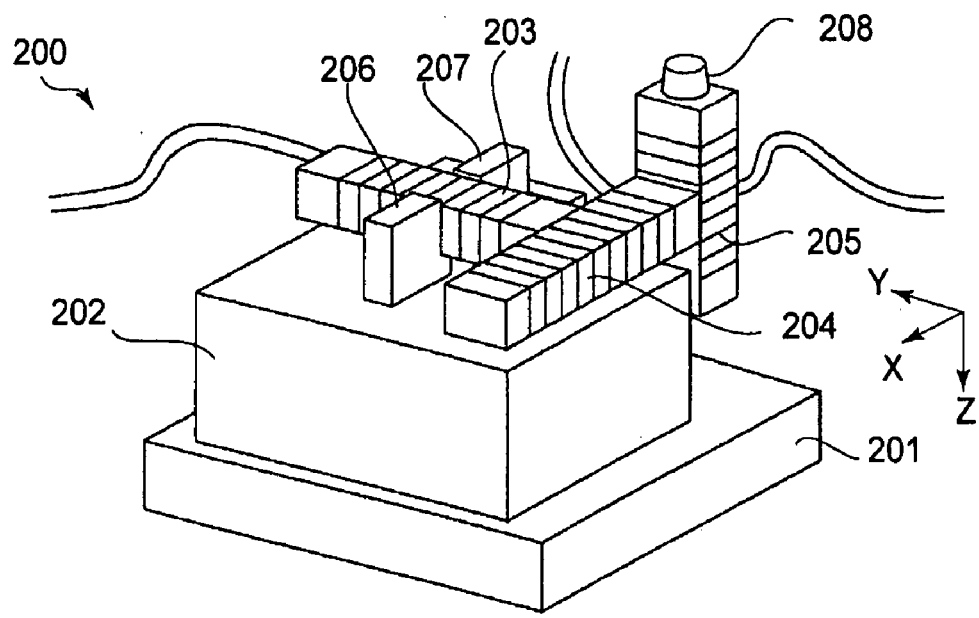
FIG. 6 is a schematic perspective view for illustrating a conventional scanning stage.
Figure 7:
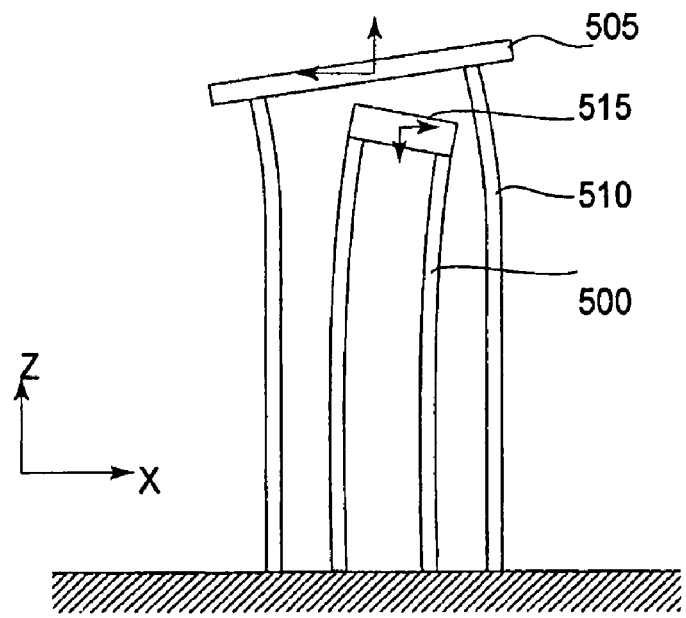
FIG. 7 is a schematic sectional view for illustrating an operation of a conventional scanning stage.

FIG. 4 is a schematic view for illustrating constituting parts of a drive stage for a scanning probe apparatus in this embodiment.

A structure and operation of two drive elements consisting of two cylindrical piezoelectric elements are identical to those in Embodiment 1.

On a supporting member 6, a small-diameter cylindrical piezoelectric element as a drive element 510 is fixed. At an end portion of the drive element 510 for a sample holding table, a probe table or sample holding table 505 formed of a light-transmissive substance is provided. The table 505 may also be provided with a hollow central portion. The table 505 is configured to hold a probe as the probe table or a sample as the sample holding table.

The drive element 510 is provided with a plurality of elements 511, 512 and 513 so that scanning drive of the sample can be effected by applying a voltage between opposite electrodes to displace the cylindrical piezoelectric element is described later.

Outside the drive element 510, a large-diameter cylindrical piezoelectric element as a counter drive element 500 for moving a counterweight 515 is disposed and fixed on the supporting member 6. The outer counter drive element 500 is also provided with a plurality of electrodes 501, 502 and 503 so that scanning drive of the counterweight 515 can be effected by applying a voltage between opposite electrodes to displace the cylindrical piezoelectric element as described later.

The respective cylindrical piezoelectric elements are driven in a manner as described in JP-A No. 2000-088983.

A driving method of the drive stage of this embodiment is the same as in Embodiment 1 described with reference to FIG. 3. Incidentally, in FIG. 3, reference numerals 530 to 533 represent reversers and reference numerals 540 to 547 represent adders.

As shown in FIG. 3, the drive stage includes two drive elements consisting of two cylindrical piezoelectric elements concentrically disposed. More specifically, inside a first cylindrical piezoelectric element 500, a second cylindrical piezoelectric element 510 is concentrically disposed. This state is shown in FIG. 4 as an exploded view. Around the first cylindrical piezoelectric element 500, divided four electrodes 501 to 504 are disposed (in FIG. 4, the electrode 504 is not shown since it is located on a backside), and at an upper portion of the first cylindrical piezoelectric element 500, a counterweight 515 is connected. Further, around the second cylindrical piezoelectric element 510, divided four electrodes 511 to 514 are disposed (in FIG. 4, the electrode 514 is not shown), and at an upper portion of the second cylindrical piezoelectric element 510, a transparent sample holding table 505 is connected. The first and second cylindrical piezoelectric elements 500 and 510 can be bent by controlling voltages applied to opposite two electrodes (501 and 503, 502 and 504, 511 and 513, or 512 and 514) so that one of the two electrodes is expanded and the other electrode is contracted. Further, it is also possible to expand and contrast each of the cylindrical piezoelectric elements in a long axis direction by applying the same voltage to the divided four electrodes. In short, the bending and the expansion and contraction of the cylindrical piezoelectric elements 500 and 510 can be controlled by voltages. Therefore, it is possible to three-dimensionally drive the sample holding table 505 disposed at the upper (top) portion of the cylindrical piezoelectric element 510 and the counterweight 515 disposed at the upper (top) portion of the cylindrical piezoelectric element 500.

The drive stage in this embodiment can also be used upside down. In this case, the sample is only required to be placed on the sample holding table.

Further, by effecting wiring as shown in FIG. 3, the outer cylindrical piezoelectric element 500 and the inner cylindrical piezoelectric element 510 are always driven in mutually opposite directions. A basic behavior of deformation of the cylindrical piezoelectric elements is the same as in JP-A No. 2000-088983. In FIG. 4, e.g., in the case where the inner cylindrical piezoelectric element 510 is bent and expanded toward a lower left direction, the outer cylindrical piezoelectric element 500 is bent and contracted toward an upper right direction. Gains -Ax, -Ay, and -Az of amplifiers 520, 521 and 522 are set to cancel inertial forces with respect to the cylindrical piezoelectric elements 500 and 510 in X, Y and Z directions, respectively. Further, these gains may desirably be corrected to optimum values when a weight of an object to be placed on a moving table.

In this embodiment constituted as described above, the drive stage is always driven so that inertial forces generated with respect to the outer first cylindrical piezoelectric element 500 and the inner second cylindrical piezoelectric element 510 are canceled. As a result, movement of the center of gravity of the drive stage can be suppressed so that it is zero or a negligible level. Accordingly, vibration of a supporting base (member) 6 for supporting the two cylindrical piezoelectric elements together can be suppressed, so that it is possible to provide a drive stage causing less vibration even when driven at high speed.

Further, inside the drive stage, an optical path or a space for passing an interconnecting line therethrough is formed as indicated by an arrow in FIG. 4, so that it is possible to ensure the optical path of laser light or the space for the interconnecting line can be ensured through a scanner in a probe scanning-type SPM. Further, in the case of imparting a function of heating and/or cooling or function of voltage application to the sample or the probe, an interconnecting line therefor can be accommodated in the space in the cylindrical piezoelectric element. Further, in the case of performing measurement using the SNOM, it is possible to pass an optical fiber probe into the cylindrical piezoelectric element or detect fluorescence or transmitted light from the sample through the drive stage.

Further, it is also possible to optically observe a state of a sample by using visible light when the sample is observed or processed with a probe of the scanning probe apparatus. In this case, imaging may be effected by receiving reflected light by disposing an image sensor on a light-emitting source side or by receiving transmitted light by disposing the image sensor on a side optically opposite from the light-emitting source via the sample.

More specifically, the counterweight is formed in a circular plate-like shape with a central hollow portion, and the outer drive element for moving the counterweight is formed in a cylindrical shape having a larger diameter than the inner drive element and is disposed outside the inner drive element for scanning-driving the sample. As a result, it is possible to ensure a movable range of the counterweight. Thus, the inertial forces are always effectively canceled, so that vibration of the supporting member leading to vibration of the sample can be suppressed.

Embodiment 3

Figure 5:
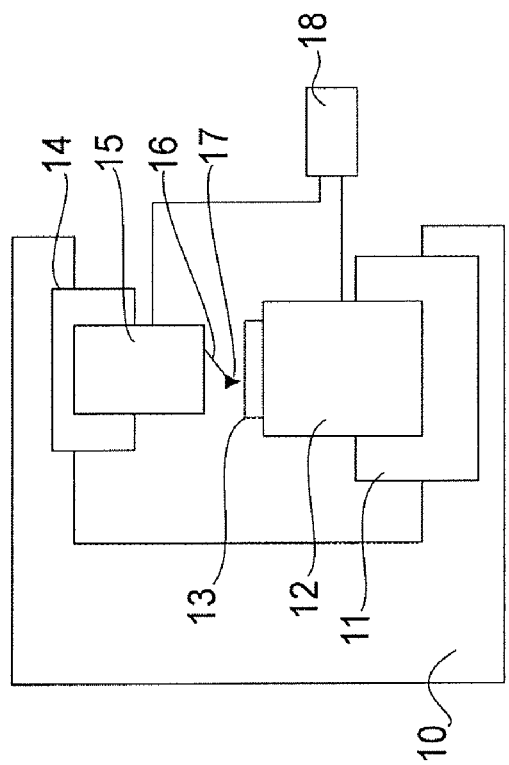
FIG. 5 is a schematic view for illustrating a scanning probe apparatus according to Embodiment 3 of the present invention.

FIG. 5 shows an atomic force microscope (AFM) as the SPM according to this embodiment of the present invention.

Referring to FIG. 5, the AFM includes a frame 10 of a main assembly of apparatus, a recess portion 11 of the apparatus main assembly provided with a visible light source for sample observation and an image sensor, a scanning stage (drive stage) 12 for performing scanning of a sample, a sample 13 which is an object to be observed or processed, a recess portion 14 provided with a light source for a drive stage of the apparatus main assembly, a scanning stage (drive stage) 15 for performing scanning of a probe 17, and a cantilever 16 provided with the probe 17. A reference numeral 18 represents a drive control circuit including a drive circuit, a control circuit, a detection circuit, and an image processing circuit. A light-receiving portion for receiving reflected light for measuring displacement of the probe 17 is not shown since it can be constituted in a conventional manner.

In this embodiment, as the scanning stage 12 for the sample 13, it is possible to use the drive stage in Embodiment 2. Further, as the scanning stage 15 for the probe 16, it is possible to use the drive stage in Embodiment 1.

While the invention has been described with reference to the structures disclosed herein, it is not confined to the details set forth and this application is intended to cover such modifications or changes as may come within the purpose of the improvements or the scope of the following claims.

This application claims priority from Japanese Patent Application No. 370094/2005 filed Dec. 22, 2005, which is hereby incorporated by reference.

What is claimed is:

1. A scanning probe apparatus for obtaining information of a sample or processing the sample with relative movement between the sample and a probe, said apparatus comprising:

a sample stage for holding the sample;

a drive stage comprising a cantilever having the probe, a table on which the cantilever is provided, and a drive element for moving the table in three directions perpendicular to each other; and a movable portion surrounding the drive element and positioned outside of the drive element, with the movable portion movable in a direction in which an inertial force generated during movement of the probe is canceled, wherein the drive stage has an optical path, through which light passes, provided inside of the drive stage.

2. An apparatus according to claim 1, wherein each of the drive element and the movable portion comprises an electro-mechanical transducer.

3. An apparatus according to claim 2, wherein the electro-mechanical transducer comprises a cylindrical piezoelectric element.

* * * * *